United States Patent
Liang et al.

(10) Patent No.: US 10,310,974 B2
(45) Date of Patent: Jun. 4, 2019

(54) SYSTEMS AND METHODS FOR INPUT/OUTPUT COMPUTING RESOURCE CONTROL

(71) Applicant: Intel Corporation, Santa Clara, CA (US)

(72) Inventors: Cunming Liang, Shanghai (CN); Edwin Verplank, Chandler, AZ (US); David E. Cohen, Hull, MA (US); Danny Zhou, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/755,414

(22) PCT Filed: Sep. 25, 2015

(86) PCT No.: PCT/CN2015/090737
§ 371 (c)(1),
(2) Date: Feb. 26, 2018

(87) PCT Pub. No.: WO2017/049590
PCT Pub. Date: Mar. 30, 2017

(65) Prior Publication Data
US 2018/0253377 A1    Sep. 6, 2018

(51) Int. Cl.
*G06F 13/20* (2006.01)
*G06F 21/85* (2013.01)
*G06F 12/0802* (2016.01)

(52) U.S. Cl.
CPC .......... *G06F 12/0802* (2013.01); *G06F 13/20* (2013.01); *G06F 21/85* (2013.01); *G06F 2213/0026* (2013.01)

(58) Field of Classification Search
CPC ........ H04L 45/74; G06F 11/323; G06F 19/00; G06F 13/404
(Continued)

(56) References Cited

U.S. PATENT DOCUMENTS 8,671,232 B1    3/2014 Garg et al.
2006/0059328 A1    3/2006 Toyohara et al.
(Continued)

FOREIGN PATENT DOCUMENTS

CN    1963789 A    5/2007
CN    103270502 A    8/2013

OTHER PUBLICATIONS

International Search Report and Written Opinion dated Jun. 24, 2016 for International Application No. PCT/CN2015/090737, 11 pages.
(Continued)

*Primary Examiner* — Faisal M Zaman
(74) *Attorney, Agent, or Firm* — Schwabe, Williamson & Wyatt, P.C.

(57) ABSTRACT

Disclosed herein are systems and methods for isolating input/output computing resources. In some embodiments, a host device may include a processor and logic coupled with the processor, to identify a tag identifier (Tag ID) for a process or container of the host device. The Tag ID may identify a queue pair of a hardware device of the host device for an outbound transaction from the processor to the hardware device, to be conducted by the process or container. Logic may further map the Tag ID to a Process Address Space Identifier (PASID) associated with an inbound transaction from the hardware device to the processor that used the identified queue pair. The process or container may use the PASID to conduct the outbound transaction via the identified queue pair. Other embodiments may be disclosed and/or claimed.

25 Claims, 8 Drawing Sheets

(58) Field of Classification Search
USPC ........ 370/397, 389, 392; 709/223, 201, 220; 710/1, 305
See application file for complete search history.

(56) References Cited

U.S. PATENT DOCUMENTS

| | | |
|---|---|---|
| 2011/0022818 A1 | 1/2011 | Kegel et al. |
| 2012/0017063 A1 | 1/2012 | Hummel et al. |
| 2013/0031333 A1* | 1/2013 | Sankaran ............ G06F 12/1027 711/207 |
| 2013/0159664 A1* | 6/2013 | Blinzer ................ G06F 9/3004 711/207 |
| 2016/0077981 A1* | 3/2016 | Kegel .................. G06F 13/102 710/48 |
| 2017/0199827 A1* | 7/2017 | Sankaran ............ G06F 9/45558 |
| 2018/0088978 A1* | 3/2018 | Li ....................... G06F 9/45558 |
| 2018/0129616 A1* | 5/2018 | Liang ...................... G06F 3/00 |

OTHER PUBLICATIONS

Extended European Search Report dated Apr. 3, 2019 for European Patent Application No. 15904466.8; 10 pages.

* cited by examiner

| Field | Bit(s) | Init Val. | Description |
|---|---|---|---|
| PASID | 19:0 | 0b | PASID associated with the queue |
| Reserved | 23:20 | 0b | Reserved |
| PASID EN | 24 | 0b | When set, the PASID TLP is enabled to carry the PASID associated with the queue |
| Reserved | 31:25 | 0b | Reserved |

FIG. 9

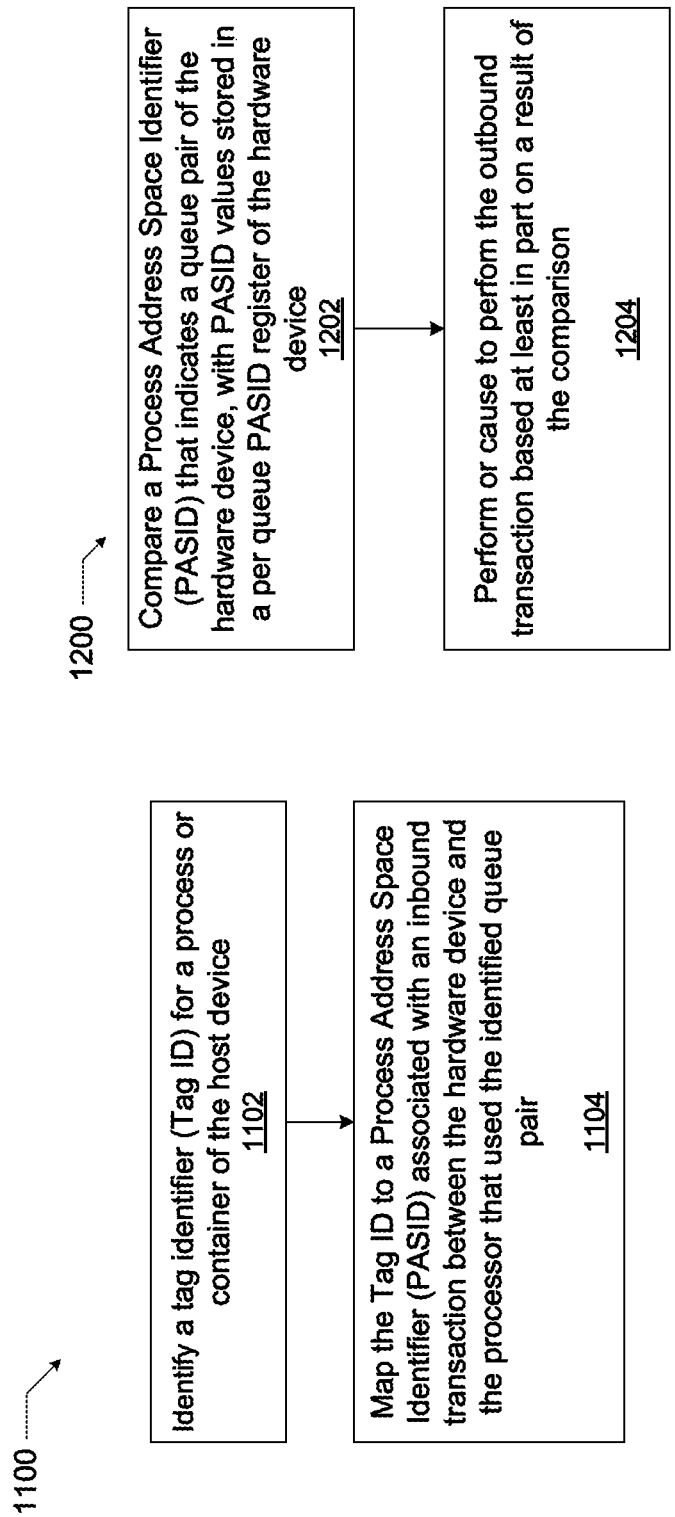

SYSTEMS AND METHODS FOR INPUT/OUTPUT COMPUTING RESOURCE CONTROL

CROSS REFERENCE TO RELATED APPLICATIONS

The present application is a national phase entry under 35 U.S.C. § 371 of International Application No. PCT/CN2015/090737, filed Sept. 25, 2015, entitled "SYSTEMS AND METHODS FOR INPUT/OUTPUT COMPUTING RESOURCE CONTROL", which designated, among the various States, the United States of America. The disclosure of International Application No. PCT/CN2015/090737 is hereby incorporated by reference in its entirety.

TECHNICAL FIELD

The present disclosure relates generally to the field of computing systems, and more particularly, to isolating Input/Output (I/O) computing resources.

BACKGROUND

Many software applications are designed to run in parallel over multiple processing cores or servers. However, no effective 110 resource partitioning techniques are available to isolate I/O resources at an adequately small granularity.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 9 illustrates an example per-queue PASID register, in accordance with various embodiments.

FIG. 11 is an example process flow diagram for securing an I/O device partition, in accordance with various embodiments.

FIG. 12 is an example process flow diagram for utilizing resources of a hardware device of a host device, in accordance with various embodiments.

DETAILED DESCRIPTION

Figure 1:
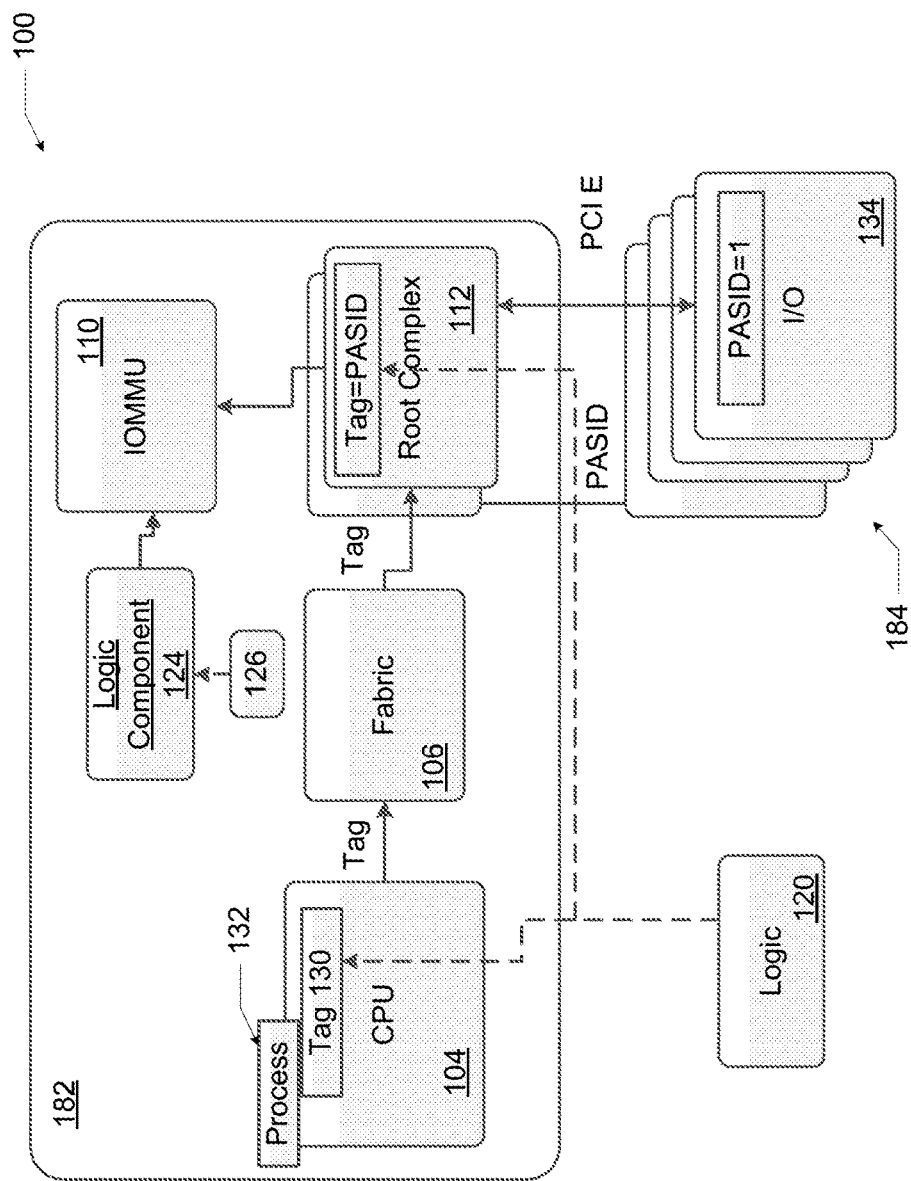
FIG. 1 is an example block diagram of an illustrative computing system incorporated with the I/O resource isolation technology of the present disclosure, in accordance with various embodiments.

Disclosed herein are systems and methods for isolating input/output computing resources. For example, in some embodiments, a host device may include a processor and logic coupled with the processor, to identify a Tag ID for a process or container of the host device. The Tag ID may identify a queue pair of a hardware device of the host device for an outbound transaction from the processor to the hardware device, to be conducted by the process or container. Logic may further map the Tag ID to a PASID associated with an inbound transaction from the hardware device to the processor that used the identified queue pair. The process or container may use the PASID to conduct the outbound transaction via the identified queue pair.

The hardware device may include logic to perform privilege check for an outbound transaction initiated by a host device and associated with a PASID that indicates a queue pair of the hardware device. The PASID may be a PASID of a process or container of the host device associated with the outbound transaction. Logic may perform the privilege check by comparing the PASID with PASID values stored in a per queue PASID register of the hardware device, and allowing the outbound transaction based at least in part on a result of the comparison.

On the compute front, processors no longer principally "scale up" by increasing clock frequency. Instead, each generation of processors has been increasing the number of cores. To take advantage of these multiple cores, software may run parallel workloads. Running a workload on specified cores with dedicated I/O resources becomes the best practice to scale out performance. From a security perspective, it may be desirable to isolate I/O resources. Several technologies including Access Control Service (ACS), Address Translation Service (ATS) that may be provided by an I/O Memory Management Unit (IOMMU), and a Single Root I/O Virtualization (SR-IOV) Virtual Function (VF) mechanism. SR-IOV have been designed to provide I/O isolation on the Peripheral Component Interconnect Express (PCIe) device level, e.g., for PCIe devices with Multi-Function (MF), Single-Function (SF), and/or VF capabilities.

However, these levels of isolations may be insufficient to support a fine-grained granularity of scheduling required to take advantage of servers deployed with high-core-count processors. Further, the emerging use of "container-based" virtualization means that multiple (e.g., thousands) "virtual execution environments" can be active on these high-core-count servers at any given point in time. This combination of high-core-counts and large numbers of active "threads" may present challenges for shared I/O devices. These challenges may be exacerbated by the introduction of high-throughput/low-latency network adapters (e.g. 25/50/100 Gbs Ethernet network interface controllers (NICs)) and Nonvolatile and Persistent Memory technologies.

For example, in the move from today's 10 Gbs NICs to 100 Gbs NICs, the per-packet processing may drop from 1,230 ns to 12.3 ns. Operating at these packet rates may require a substantial change in the way network packets are processed on a server being shared by multiple workloads. Further, current generation NAND-based non-volatile memory (NVM) devices may drive millions of I/O devices on a single server for distributed storage workloads in combination with higher capacity NICs, which may require high utilization of I/O resources.

It may be desirable to partition the I/O resources in the same way that host Central Processing Unit (CPU) and Dynamic random-access memory (DRAM) or cache resources are partitioned.

Standard PCIs (e.g., NIC operation) includes queue infrastructure that may take advantage of the embodiments described herein. In order to allow multiple workload instances to drive each of the dedicated IO resources (e.g. receive and transmit queues) on the same PCIe device, a pseudo device (e.g. queue) level of granularity resource isolation mechanism is necessary. Inbound Direct Memory Access (DMA) I/O access, IOMMU may be used to provide the secure access on pseudo device granularity. For example, in some embodiments, a host device may identify a PASID for a process or container of the host device and associate the PASID with an individual queue pair of a hardware device of the host device. The queue pair may include two complementary queues that may be owned by the process or container upon association with the PASID.

It may be desirable to provide a pseudo device level secure I/O access on outbound CPU I/O access side as well. SR-IOV may be one of the approaches to solve the problem. By Bus, Device, Function (BDF), each independent resource may be exposed as a separate pseudo device. The SR-IOV-capable PCIe devices may register space remapping for the resource isolation.

In terms of scaling, use of SR-IOV may work for a 100-plus level instance isolation. However for an operating-system-level virtualization, which usually requires a thousand (1000+) level instances, SR-IOV may be insufficient. In fact, the modern network interface cards already provide more than one thousand queues, but there is no secure method by which these queues can be exposed to a user space process.

Various ones of the embodiments disclosed herein may provide techniques for solving the outbound CPU I/O secure access problem. In embodiments, the CPU runtime context may record a unique identifier (ID), which may be used by the outbound request transaction to the endpoint to check its privilege. This unique ID may belong to the dedicated I/O resource. For example, the unique ID may represent a partitioned resource ID or a namespace ID, to which the accessing resource belongs. The ID may be unique per isolated execution instance (e.g., process, container) so that it may be loaded during context switch. The max number of execution instances may depend on the bit width of the unique ID. The described embodiments may utilize all the functionalities of existing device isolation mechanism (e.g., IOMMU, ACS for MF, SR-IOV), and provide a fine grained secure method for frequent outbound register updates.

For example, when the CPU attempts to access I/O (e.g., memory-mapped I/O (MMIO) or port-mapped I/O (PIO)), the outbound transaction may carry a unique ID (hereinafter Tag ID) to the PCIe endpoint (e.g., I/O device). The associated Tag ID may identify the namespace of the dedicated I/O device. The root complex may associate the Tag ID with the PCIe transaction, which may be translated from the original memory request. There may be different approaches to associate the Tag ID with the outbound transaction. For example, a customized TLP prefix may be defined and used as the Tag ID, which may be cumbersome and may require an extension of existing PCIe specification.

The embodiments disclosed herein may take advantage of PASID functionality of an IOMMU and the PASID TLP prefix of the PCIe specification. For example, the PASID TLP prefix may be used in inbound DMA I/O transaction for an instance level IOMMU translation and for isolation of partitioned I/O in parallel DMA access, as briefly discussed above. The PASID TLP prefix may be reused in a subsequent outbound I/O transaction to define the Tag ID.

Typically, the PASID TLP prefix may not be used on the outbound transaction. However, a PASID (e.g., PASID TLP prefix) previously used in an inbound transaction may be utilized in an outbound transaction because it may be recognized by the system. For example, the Tag ID in a form of a PASID TLP prefix may be recognized by a PCIe device (e.g. NIC). Accordingly, the PCIe device may use the Tag ID to perform a privilege check during the register access.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the term "logic" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable hardware that provide the described functionality. As used herein, the term "Input/Output resource" or "I/O resource" may refer to a hardware-configurable component located in a PCIe device (e.g., receive/transmit queue pairs and request/response queue pairs). As used herein, the term "container" may refer to an operating system-level virtualization environment for running multiple isolated guest systems on a single control host.

FIG. 1 is an example block diagram of an illustrative computing system 100 incorporated with the I/O resource isolation technology of the present disclosure, in accordance with various embodiments. The computing system 100 may include a host device 182 and one or more hardware devices (e.g., PCIe I/O devices, hereinafter I/O devices) 184. The host device 182 may include a CPU including one or more processing cores 104, a switching fabric 106 coupled with the CPU (processing cores) 104, and a root complex 112 coupled with the switching fabric 106 and IOMMU 110. In some embodiments, the host device 182 may be provided on a system on a chip (SOC).

The computing system 100 may include logic 120 coupled with the CPU (processing cores) 104 and configured to manage the transactions between the CPU (processing cores) 104 and I/O device 184, such as outbound transactions from the CPU 104 to I/O device 184, according to embodiments described herein. Logic 120 may identify a Tag ID 130 for a process or container 132 of the host device 182, and provide the Tag ID 130 to the root complex 112 via the fabric 106. The Tag ID 130 may identify a part of the I/O device 184 (e.g., a queue pair 134) for an outbound transaction from the CPU 104 to a selected one of the I/O device 184 (e.g., queue pair 134 identified by Tag ID 130), to be conducted by the process or container 132. Logic 120 may, at the root complex 112 level, configure a mapping table to map the Tag ID 130 to a PASID. The mapped-to PASID may be associated with an inbound transaction from the I/O device 184 to the CPU 104 that used the identified queue pair 134 (e.g., provided by IOMMU 110). For example, logic 120 may be associated with a logic component 124 to store PASIDs associated with inbound transactions between the I/O device 184 and the CPU 104 in a PASID repository 126. Logic 120 may be configured to retrieve the PASID from the PASID repository 126 on demand. The root complex 112 may use the PASID to conduct the outbound transaction between the CPU 104 and I/O device 184 via the identified queue pair. At the hardware devices level, logic 120 may cause a determination of whether the queue pair 134 is PASID-enabled, e.g., whether a transaction associated with a PASID may be performed. Based on a result of this determination, the transaction associated with the process 132 may be performed. These and other embodiments are discussed in detail below.

Figure 2:
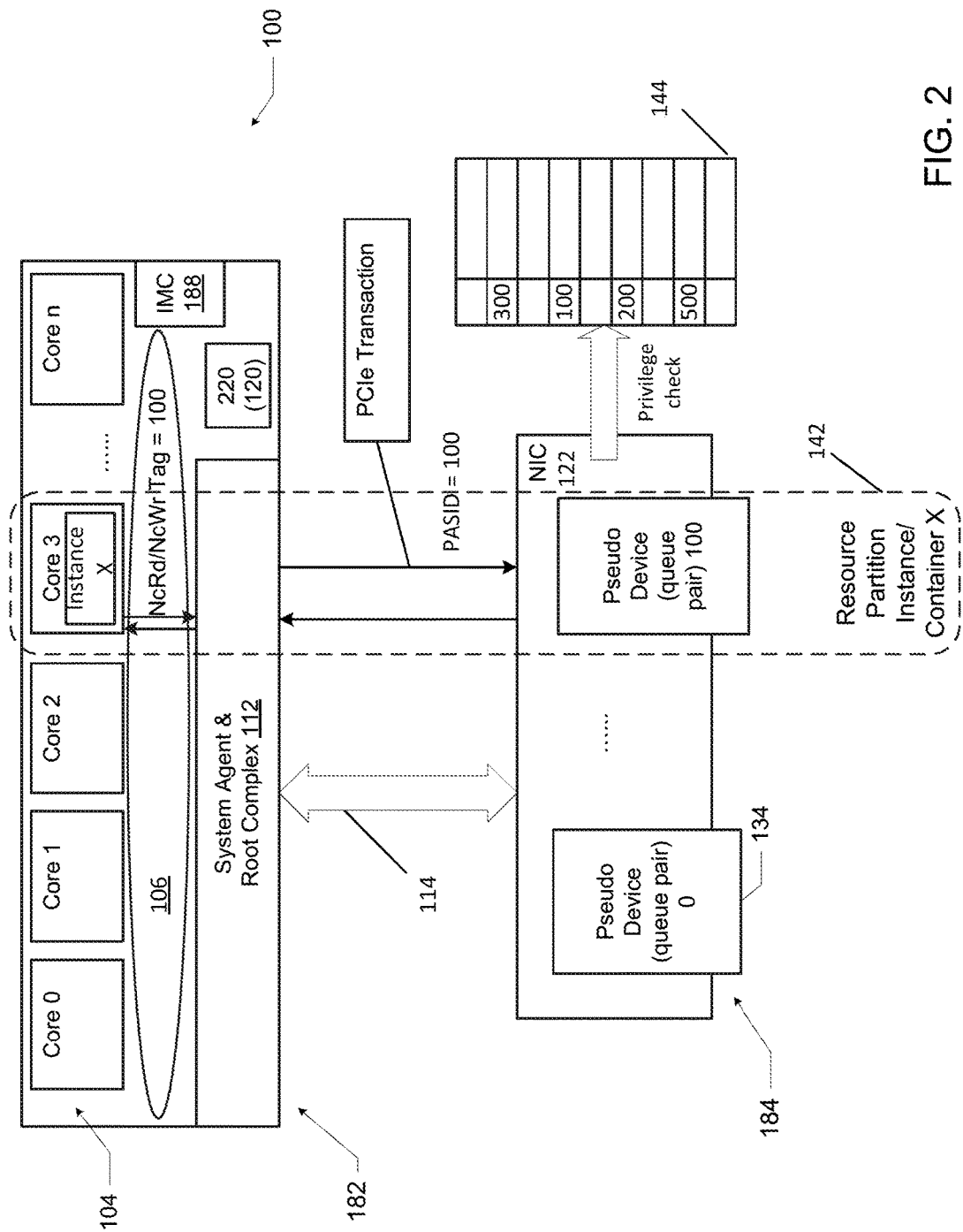
FIG. 2 is a detailed example block diagram of an illustrative computing system incorporated with the I/O resource isolation technology of the present disclosure, in accordance with various embodiments.

FIG. 2 is a detailed example block diagram of an illustrative computing system 100 incorporated with the I/O resource isolation technology of the present disclosure, in accordance with various embodiments. For purposes of description, like components of FIGS. 1 and 2 are indicated by like numerals.

As described in reference to FIG. 1, the host device 182 may include one or more processing cores 104. These processing cores 104 may be assigned, singly or in any desired combination, to various processes or containers running on the host device 182. As used herein, the term "instance" may refer to a process or container. Multiple instances may run in parallel on the host device 182 by having different ones of the processing cores 104 assigned to them. For example, in the computing system 100 of FIG. 2, one of the processing cores 104, Core 3, is shown by the dotted line 142 as assigned to or "owned by" a particular instance, Instance X. Other resources of the computing system 100 may also be assigned to different instances in order to achieve parallel operation, as discussed in detail herein.

The host device 182 may include a system agent and root complex 112. The system agent and root complex 112 may provide root complex functionality by including one or more hardware components that connect processor complexes to the I/O subsystem and the memory subsystem of the computing system 100.

As described above, the host device 182 may include the switching fabric (e.g., ring bus) 106. The switching fabric 106 may provide communications pathway between the cores 104 and other components of the host device 182.

As further described above, the host device 182 may include an IOMMU 110 (not shown in FIG. 2) that may serve to connect an I/O bus (not shown) to a main memory, and may map physical addresses to virtual addresses and may remap virtual address to physical addresses. The system agent and root complex 112 may be in communication with the IOMMU 110.

The host device 182 may include logic 120 (e.g., in a form of a privileged agent) 220. The privileged agent 220 may be configured to perform various resource isolation operations, such as assigning various ones of the cores 104 to different instances and partitioning I/O resources for different instances, as discussed below. In various embodiments, the privileged agent 220 may include different device kernel drivers for different ones of the I/O device 184.

The host device 182 may also include an Integrated Memory Controller (IMC) 188. The IMC 188 may manage the flow of data to and from the processor cores 104.

The I/O device 184 may include any suitable networking and storage hardware devices, such as PCIe-compatible networking and storage hardware devices. For example, the I/O device 184 illustrated in FIG. 2 include a NIC 122. In various embodiments, the computing system 100 may include more or fewer hardware devices than the examples illustrated in FIG. 1. For example, the computing system 100 may include more than one NICs, or may include Non-Volatile Memory Express (NVMe) controllers (not shown) configured for accessing solid-state drives (SSDs) in accordance with the Non-Volatile Memory Host Controller Interface Specification (NVMHCI). For example, the computing system 100 may include two or more NICs (configured as discussed herein with reference to the NIC 122) and/or two or more NVMe controllers.

The I/O device 184 may be in communication with the privileged agent 120. FIG. 2 illustrates a communication pathway 114 between the privileged agent 220 and the NIC 122. The communication pathway 114 may be used by the privileged agent 220 for partitioning and isolating resources of the NIC 122, respectively, between different instances running on the host device 182, as discussed below. Different ones of the I/O device 184 may include different numbers of queue pairs (and may also support different queue schemes).

Each of the I/O devices 184 may include one or more pseudo devices (queue pairs). As used herein, a "queue pair" may refer to two complementary queues (e.g., a receive queue and a transmit queue, a request queue and a response queue, or a submission queue and a completion queue). As shown, the NIC 122 may include multiple queue pairs pseudo devices (queue pairs) 134. Various ones of the techniques disclosed herein may enable the privileged agent 220 of the host device 182 to assign various queue pairs of the I/O device 184 to instances running on the host device 182. The granularity of this assignment may be at the individual queue pair level, a capability not achieved by conventional resource assignment techniques.

Each of the I/O devices 184 may be in communication with the system agent and root complex 108. For example, the NIC 122 may be coupled to the system agent and root complex 112 via the communication pathway 114.

The computing system 100 may include a root table, one or more context tables, one or more PASID tables, and one or more paging structures (not shown). Entries in the PASID table may include a PASID and a root of a first-level translation structure used to translate requests tagged with the corresponding PASID.

The I/O device 184 may include or have access to registers for storing PASID values for one or more of the queue pairs therein. In the example of FIG. 2, the NIC 122 may store PASIDs, e.g., "100," "200," "300," etc. in portions of the register 134 associated with respective queue pairs 100, 200 (not shown), 300 (not shown), etc. The PASID values stored in the register associated with a queue pair may indicate which instance of the host device 182 "owns" or has that queue pair assigned to it.

The host device 182 (e.g., logic 120) may identify a Tag ID for a process or container (instance) of the host device 182, and map the Tag ID to a PASID associated with an individual queue pair of an I/O device 184. Upon association with the PASID, the queue pair may be owned by the instance. As used herein, a queue pair may be "owned by" or "assigned to" an instance when the instance can use the queue pair exclusive of other instances. The logic configured to perform the operations of the host device 182 discussed herein may be distributed among any number of suitable components of the host device 182. For example, in some embodiments, the logic of the host device 182 discussed herein may be included in the privileged agent 220 (which may be, for example, a privileged software agent).

With reference to the example of FIG. 2, the host device 182 may include logic to identify a Tag ID for Instance X, for example, Tag ID 100 corresponding to a namespace ID 100. As known, a namespace is a software construct configured to group processes associated with a transaction (e.g., inbound or outbound) together. In advance, the namespace ID 100 may be associated with a pseudo device (queue pair) 100. The host device 182 may map the Tag ID 100 with a PASID associated (e.g., in a previous transaction) with the queue pair 100 of the NIC 122 and thereby assign the queue pair 100 to Instance X. In some embodiments, the privileged agent 220 may perform this association. Accordingly, a specified Instance X that may use the namespace ID 100 which is now permitted to use one queue pair. The dedicated queue pair registers may be associated with this ID. A workload instance X may be executing in container X on Core 3, in the context of namespace 100. When host device 182 is executing a non-cacheable read or write (NcRd/NcWr) transaction, Tag ID 100 may be taken by root complex 112, and then used in PCIe transaction to the NIC 122, as shown in FIG. 2. The NIC 122 may utilize the namespace ID 100 to perform a privilege check with the resource ID associated with the queue pair register 144.

Accordingly, a virtual channel between CPU and partitioned PCIe device resource may be set up as briefly discussed in reference to FIGS. 1-2. The virtual channel may be composed of two segments: a segment between CPU (processor cores) 104 and root complex 112, and a segment between root complex 112 and PCIe device (e.g., I/O device 184, such as NIC 122).

The first segment from CPU (processor cores) 104 to root complex 112 may provide for carrying a new Tag ID (e.g. identified by the namespace ID) during MMIO/PIO memory request/response. The second segment, from root complex 112 to PCIe device (NIC 122), may leverage the PASID TLP prefix (described above) to carry the Tag ID (e.g. name space ID) in PCIe transaction, if the PCIe device (NIC 122) has the PASID TLP capability. After the register access request goes to the device (NIC 122), the device may perform privilege check (e.g., check permissions) by comparing the tag value with the pre-configured resource ID associated with each resource (e.g., each queue pair registers 144 in NIC 122).

As described above, a PASID TLP capable device (NIC 122) may typically send an inbound transaction request with the PASID TLP prefix to the root complex 112 of the host device 182. In the embodiments discussed herein, the host device 182 may request the I/O device 184 (e.g., NIC 122) to support receiving outbound request with PASID TLP prefix from root complex 122. The extended capability of the hardware devices 182 may be advertised by the extended capability header as described below.

In summary, the described embodiments provide for: carrying the tag (e.g., name space ID) value during MMIO/PIO access initiated by the host device 182, sending the tag value (e.g., name space ID) to the PCIe device by PASID TLP, performing privilege check on register access, and performing secure I/O resource partitioning.

Figure 3:
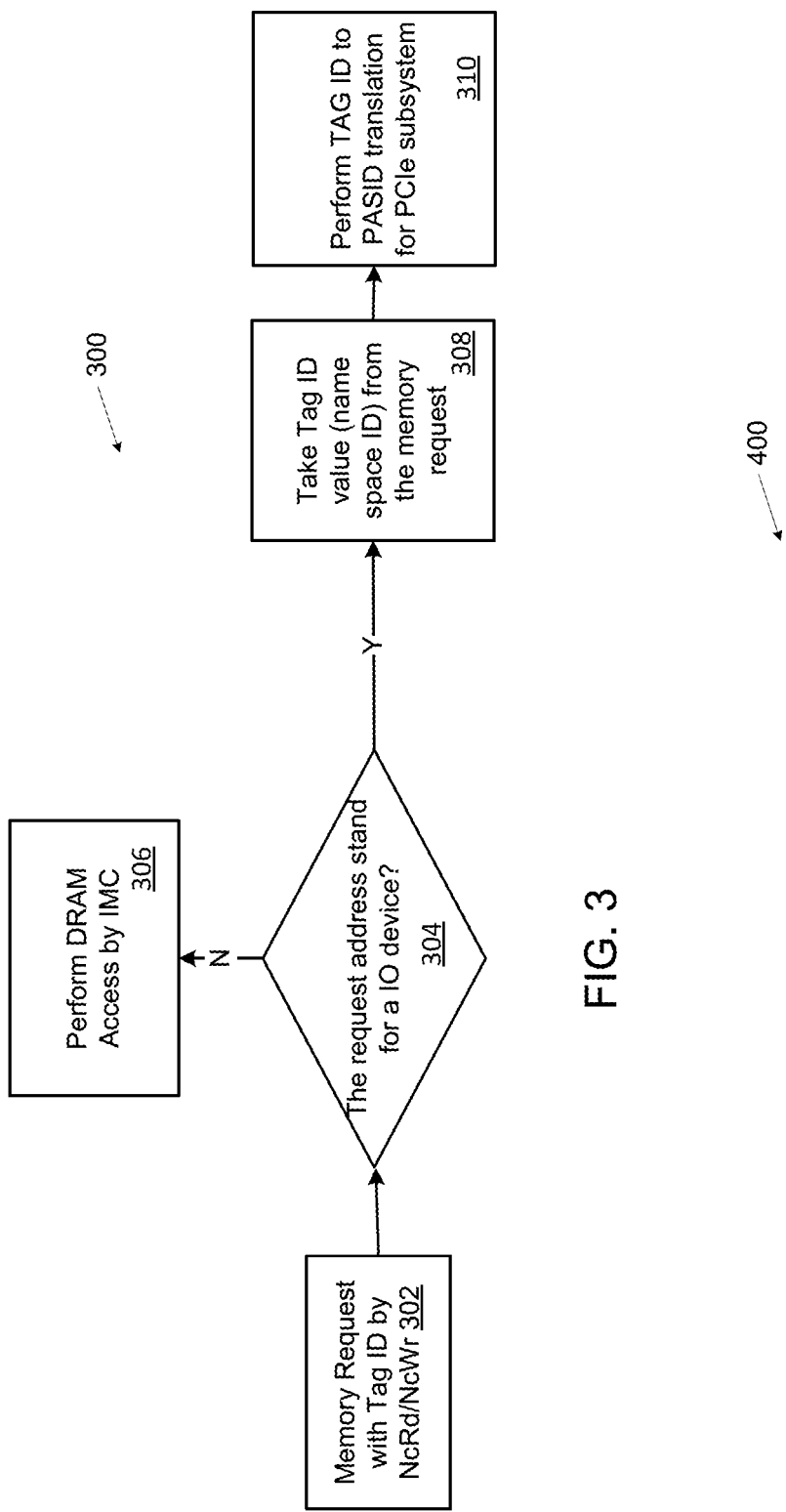
FIG. 3 is an example process flow diagram for providing a tag identifier (Tag ID) during memory access, in accordance with various embodiments.

FIG. 3 is an example process flow diagram 300 for providing a Tag ID during memory access, in accordance with various embodiments. The process 300 may be performed, e.g., by the host device 182.

At 302, the host device 182 may receive a memory access (e.g., MMIO/PIO) request from CPU 104, e.g., a request for non-cacheable read or write (NcRd/NcWr transaction.

At 304, the host device 182 may determine whether the memory access request includes the Tag ID. The memory request may be associated with a Tag ID, whose value may come from a specific register. For example, the host device 182 may, in advance of the request, identify the queue pair as an unused queue pair from a pool of queue pairs, generate the Tag ID associated with the identified queue pair, and cause storage of the Tag ID for the queue pair in a register. The register may be a Model-Specific Register (MSR).

Figure 4:
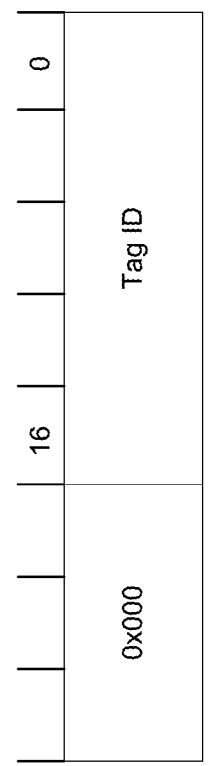
FIG. 4 illustrates an example Model-Specific Register (MSR) configured to store Tag ID, in accordance with some embodiments.

FIG. 4 illustrates an example MSR configured to store Tag ID, in accordance with some embodiments. As shown, the MSR 400 may be introduced to store the runtime Tag ID (e.g., namespace ID). The MSR 400 may be, for example, a 32 bits width register, in which the least significant 20 bits may be used to store the tag value. The size of 20 bits allocated for storage of a Tag ID may allow for about 1 million isolated partitioned resources. The Tag ID value in MSR register may be loaded (e.g., by logic 120) during the task context switch. Accordingly, the Tag ID value may be stored in a task control block.

Referring to FIG. 3, if the host device 182 determines at 304 that the memory request does not include the Tag ID, e.g., the requested address does not stand for an I/O device, the process 300 may move to 306, in which DRAM access may be performed in a conventional way, e.g., by IMC 188. If the host device 182 determines at 304 that the memory request includes the Tag ID, the host device 182 may, at 308, retrieve the Tag ID value from the memory request and provide it to a corresponding root complex 112.

At 310, the host device 182 may translate the Tag ID value to PASID that may be used in PCIe sub-system if the PCIe endpoint is PASID capable, and perform the memory-mapped request associated with the PASID value. For example, the host device 182 may map the Tag ID to a PASID associated with an inbound transaction that used the identified queue pair, e.g., 1:1 pass-through mapping with same value as provided in the Tag ID (e.g., to save some register space). Any memory access failure may result in an MMIO/PIO exception, which may cause an exception progress sequence.

Figure 5:
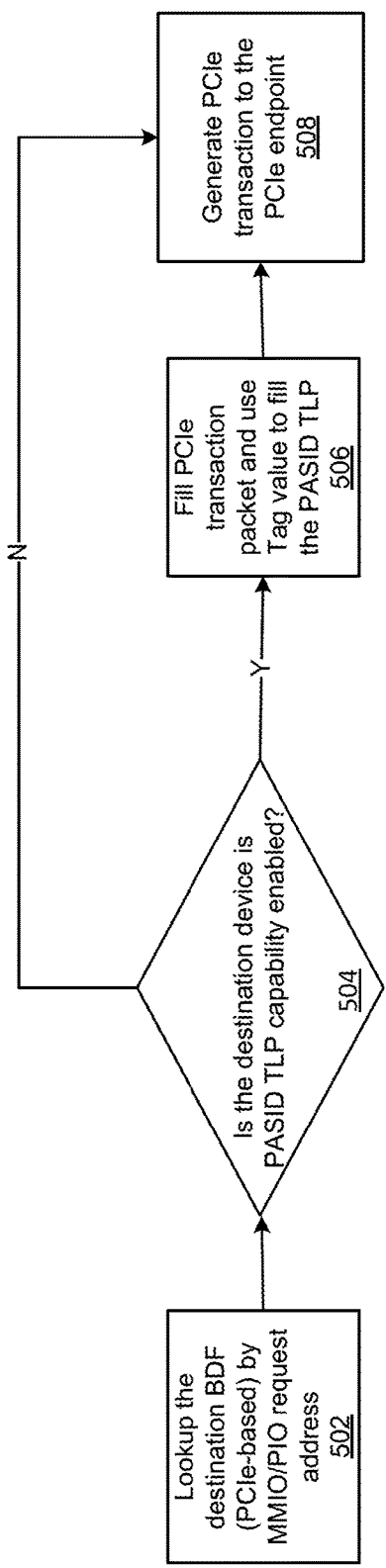
FIG. 5 is an example process flow diagram for providing a Tag ID to an I/O device during memory access, in accordance with various embodiments.

FIG. 5 is an example process flow diagram 500 for providing a Tag ID to an I/O device during memory access, in accordance with various embodiments. The process 500 may be performed, e.g., by the host device 182, such as, at a PCIe root complex level. It is assumed that the process described in reference to FIGS. 3-4 has been completed.

At 502, the host device 182 may determine the PCIe destination BDF number by the MMIO/PIO address. The term "BDF number" is usually used (e.g., in the PCIe specification) to identify the PCIe device. Accordingly, BDF may be considered a kind of a format, and the BDF number is the value present in that format. The BDF number may fill in the request transaction, and may be used as Requestor ID in the response transaction.

At 504, the host device 182 may determine whether the endpoint of the requested transaction (e.g., a queue pair identified in FIG. 3) is enabled with PASID capability. In other words, it may be determined whether the endpoint may accept and recognize PASID associated with the requested transaction.

If the endpoint is determined to be a PASID capable device, at 506 the host device 182 may include the PASID in a PASID TLP prefix (FIG. 6) and fill PCIe transaction packet. For example, to encapsulate the PCIe transaction, some necessary data needs to be filled. The content may include BDF number, address and PASID ID in PASID TLP. In other words, necessary data may be written for the transaction to be performed.

At 508, the host device 182 may generate the PCIe transaction to the endpoint. The PCIe root complex may check the PCIe transaction completion success or failure.

Figure 6:
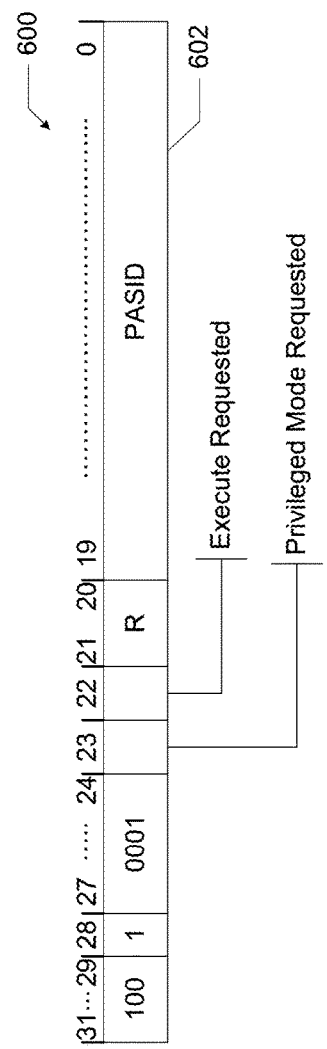
FIG. 6 illustrates an example Transaction Layer Packet (TLP) prefix that may include a Process Address Space Identifier (PASID) and may be used for isolating I/O resources, in accordance with various embodiments.

FIG. 6 illustrates an example TLP prefix 600 that may include a PASID and may be used for isolating I/O resources, in accordance with various embodiments. In particular, the PASID of the instance associated with the outbound transaction may be included in the PASID field 602 of the TLP prefix 600. The structure of the TLP prefix 600 may be a structure specified in the PCI Express specification, but not its use as disclosed herein for supporting I/O computing resource isolation.

Using PASID TLP prefix may be one of different ways to carry a Tag ID from root complex to endpoint, and is used is an example, not limiting this disclosure. The reason for using PASID TLP prefix is because it is included in a standard PCI Express specification. Further, it may be reasonable for a PCIe device to implement one set of PASID registers for the inbound and outbound transaction purposes. In general, any customized TLP prefix may be defined to take the Tag ID as long as the CPU of the host device and endpoint of the hardware device described above are configured to communicate with each other. The format of the TLP prefix of FIG. 6 may not be limited to the example described herein.

In order to advertise the capability of PASID TLP prefix, an extended capability header may be used in PCIe configure space. As the PASID is usually used on the inbound request (e.g., DMA) to the root complex, the PCI Express specification does not describe the endpoint to be capable of processing the receiving transaction with PASID TLP prefix. This capability may be added into the specification so as to advertise the endpoint's receiving capability in association with PASID.

Figure 7:
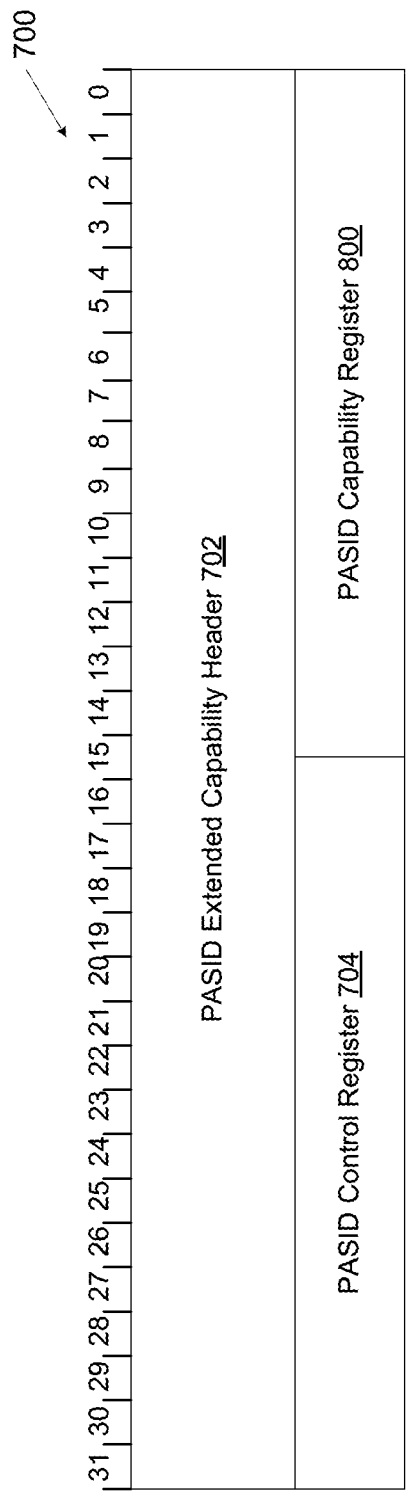
FIG. 7 illustrates an example PASID Extended Capability structure that may be used to enable PASID capability for allocation of queues in a hardware device, in accordance with various embodiments.

FIG. 7 illustrates an example PASID Extended Capability structure 700 that may be used to enable PASID capability for allocation of queues in an I/O device 184, in accordance with various embodiments. The PASID Extended Capability structure 700 may include a PASID Extended Capability Header 702, a PASID Control register 704, and a PASID Capability register 800 (described in reference to FIG. 8). The PASID Extended Capability structure may be a structure specified in the PCI Express specification, but its use as disclosed herein for supporting I/O computing resource isolation is not. The PASID Extended Capability structure may be included in the I/O device 184. The PASID Control register may be used to support PASID capability for allocation of queues in an I/O device 184, in accordance with various embodiments. In particular, the global PASID Enabled (EN) field (not shown) of the PASID Control register 704 may be set, by the host device 182, to allow the host device 182 (e.g., the privileged agent 120) to enable PASID extension. If an I/O device 184 supports PASID, this capability may be advertised in the PASID Extended Capability structure 700, but the capability may only be enabled upon setting the global PASID Enabled field. The remaining fields of the PASID Control register 400 may be used as specified in the PCI Express specification. The PASID Control register 400 may be read-only.

Figure 8:
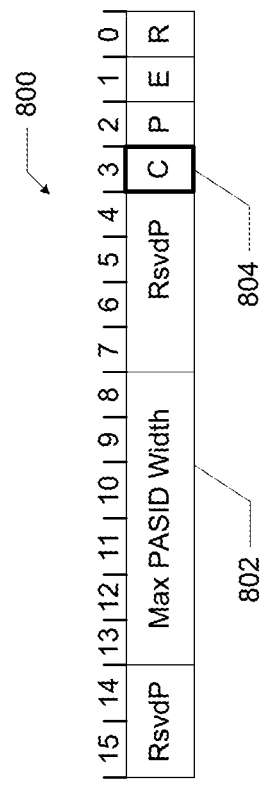
FIG. 8 illustrates an example PASID Capability register, which may be used to support PASID capability for allocation of queues in a hardware device, in accordance with various embodiments.

FIG. 8 illustrates an example PASID Capability register 800, which may be used to support PASID capability for allocation of queues in an I/O device 184, in accordance with various embodiments. In particular, the Max PASID Width field 802 of the PASID Capability register 800 may be set, by the host device 182, to a value M such that $2^M$ is greater than or equal to the number of queues of the I/O device 184 (so that each queue may be associated with a unique PASID, if desired).

To be compatible with the existing PCIe devices, a compatible extension flag may be defined to advertise the capability of receiving outbound request with PASID TLP prefix from root complex. As shown in FIG. 7, field "C" [Bit3] flag 804 may be used to advertise the extension. The remaining fields of the PASID Capability register 800 may be used as specified in the PCI Express specification. The PASID Capability register 800 may be read-only from the perspective of software, but may be set by the I/O device 184.

FIG. 9 illustrates an example per-queue PASID register 900, in accordance with various embodiments. The per-queue PASID register 900 may be associated with a particular queue of the I/O device 184. The per-queue PASID register 900 may be a set of 32 bit global registers, the number of which may depend on how many queue pairs the device supports. Each 32 bit register may belong to a queue pair.

The per-queue PASID register 900 may include, for example, a PASID field 902, a PASID Enabled field 908, and two Reserved fields 910 and 912. The PASID field 902 may be used to store a PASID associated with the queue (e.g., as provided by the host device 182 to the I/O device 184 when assigning a queue to an instance).

The PASID EN field 908 may serve as the per-queue PASID Enabled indicator. This field may also be referred to as PASID_EN[n], where n is an index of the queue pair within the I/O device 184. The PASID EN field 908 may be a single bit that, when set, indicates that the I/O device 184 is allowed to use a TLP that includes the PASID in the PASID field 902. Accordingly, the PASID field 902 may take effect only if PASID_EN field 908 is set. In other words, the I/O device 184 may only be able to use the PASID value stored in the PASID field 902 if the bit of the PASID EN field 908 is set. No privilege check may happen on the specified queue pair when its PASID_EN is not set. The Reserved fields 910 and 912 may be reserved for a future purpose.

Although particular example numbers of bits for each field, and particular initial values for each field, are shown in FIG. 9, these are simply examples and any suitable number of bits or initial values may be used. Additionally, a per-queue PASID register may take an entirely different form than the example given in FIG. 9.

As described in reference to FIGS. 1-9, requests to configure the resource allocation may be carried out by the privileged driver software, such as logic 120 (privileged agent 220) of FIGS. 1-2. In embodiments, such software may run inside the kernel of the system 100. The privileged agent 220 may take responsibility to allocate and split I/O resource to user space instance (process/container). When the user space instance applies for a specific device resource, kernel knows which namespace ID (Tag ID) that instance is using. Kernel device driver takes that namespace ID and put into the specific PASID register for the associated I/O resource (FIG. 9). For each process context switch, the namespace ID may be loaded into the MSR, to provide mapping of the namespace ID to Tag ID value. When the MMIO read/write transaction occurs, the Tag ID value in the MSR may be used by CPU to generate a PCIe message with PASID TLP prefix.

Figure 10:
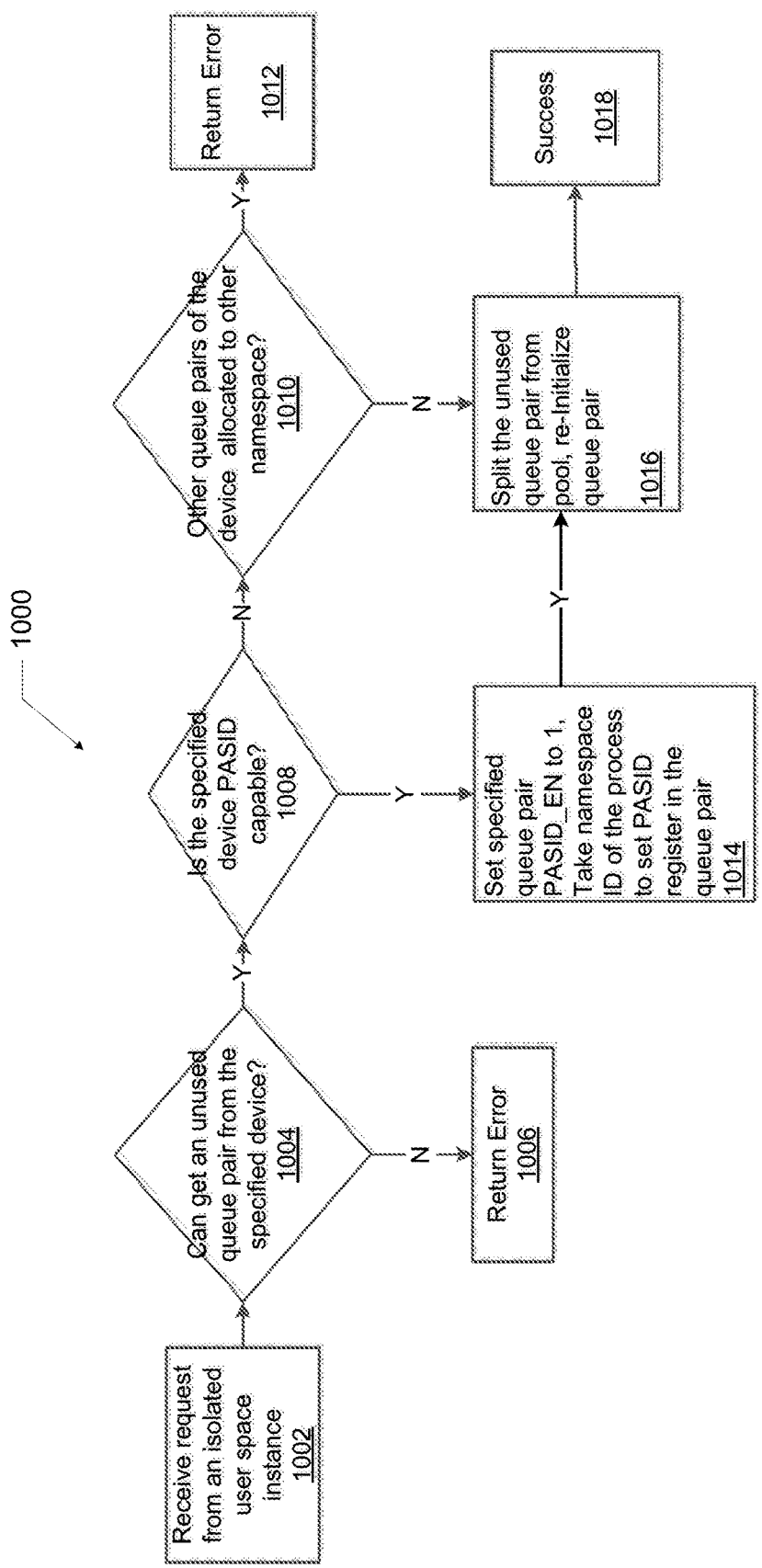
FIG. 10 illustrates an example per-queue receive descriptor tail register, in accordance with some embodiments.

FIG. 10 is an example process flow diagram 1000 for securing an I/O device partition, in accordance with various embodiments. The process 500 may be performed, e.g., by the host device 182, such as, privileged agent 220 running inside the kernel.

At 1002, the host device 182 may receive a memory access request from an isolated user space instance, as described in reference to FIG. 3. For example, the request may be a read or write memory access request via an I/O device, such as I/O device 184 (NIC 122).

At 1004, the host device 182 may determine whether a yet unused queue pair may be used in an I/O device (e.g., I/O device 184) specified in the request, for the requested transaction. If no unused queue pairs are available (e.g., all queue pairs for the requested I/O device are assigned to other instances), the process 1000 may proceed to 1006 and return error.

Otherwise, the process 1000 may proceed to 1008, at which the host device 182 may determine whether the specified I/O device is PASID capable. If it is determined that the I/O device is not PASID capable, the process 1000 may proceed to 1010, at which the host device 182 may determine whether other queue pairs of the I/O device may be allocated to another namespace. If it is determined that other queue pairs of the I/O device are allocated to another namespace, at 1012, the process 1000 may return error. Otherwise, the process 1000 may proceed to 1016.

If it is determined at 1008 that the specified I/O device is PASID capable as described in reference to FIG. 8, at 1014 the host device 182 may set (or cause the I/O device 184 to set) the specified queue pair PASID_EN flag to 1, to enable the I/O device 184 to acknowledge or perform the transaction with PASID for the specified queue pair, as described in reference to FIG. 9. The host device 182 may further take namespace ID of the requested process to set per-queue PASID register.

At 1016, the host device 182 may split the queue pair from the pool of available queue pairs (e.g., as part of a software cleanup procedure) and re-initialize the queue pair to be used in the requested transaction (e.g., by resetting the queue pair).

At 1018, the host device 182 may verify and acknowledge success of the transaction.

FIG. 11 is an example process flow diagram 1100 for utilizing resources of an I/O device 184 of a host device 182, in accordance with various embodiments. The process 1100 may be performed, e.g., by the host device 182 (e.g., the privileged agent 110). For example, the host device 182 may include one or more computer readable media having instructions (e.g., agent 110) thereon that, in response to execution by one or more processor of the host device, may cause the host device to perform the process 1100.

At 1102, the host device 182 may identify a Tag ID for a process or container of the host device. The Tag ID may identify a queue pair of a hardware device of the host device for an outbound transaction between the processor and the hardware device, to be conducted by the process or container.

At 1104, the host device 182 may map the Tag ID to a PASID associated with an inbound transaction between the hardware device and the processor that used the identified queue pair, to enable the outbound transaction by the process or container via the identified queue pair.

In some embodiments, 1102 may include identifying the queue pair as an unused queue pair from a pool of queue pairs, generating the Tag ID associated with the identified queue pair, and causing storage of the Tag ID for the queue pair in a register of the host device.

In some embodiments, the process 1100 may further include determining whether the queue pair is PASID-enabled, and, based on a result of the determination, including, by the host device, the PASID in a TLP prefix. The method 1100 may further include generating a transaction to the queue pair in accordance with the memory request and in association with the PASID TLP prefix, to perform the transaction using the queue pair. In some such embodiments, the method 1100 may further include setting a PASID Enabled indicator of a per-queue PASID register of the hardware device to enable the hardware device to perform the transaction using the queue pair; using the namespace ID to set the per-queue PASID register; and re-initializing the queue pair to be used in the transaction.

FIG. 12 is another example process flow diagram 1200 for utilizing resources of an I/O device 184 of a host device 182, in accordance with various embodiments. The process 1200 may be performed, e.g., by an I/O device 184 (e.g., the NIC 122). For example, the NIC 122 may include a hardware solution to perform the process 1200. In some embodiments, the NIC 122 may include one or more computer readable media having instructions thereon that, in response to execution by one or more processors of the host device, may cause the host device to perform the process 1200.

At 1202, the I/O device 184 may compare a PASID that indicates a queue pair of the hardware device, with PASID values stored in a per queue PASID register of the hardware device. The PASID may be a PASID of a process or container of the host device associated with the outbound transaction.

At 1204, the I/O device 184 may perform, or cause to be performed, the outbound transaction based at least in part on a result of the comparison.

In some embodiments, the process 1200 may further include, prior to 1202, determining that a PASID Extended Capability indicator of a PASID Capability Register is set, and determining that a PASID Enabled indicator of per-queue PASID registers associated with the queue pair is set.

In some embodiments of the process 1200, the PASID Extended Capability register may provide for performance of outbound transactions, the outbound transactions may comprise PCIe transactions, and the I/O device 184 may be a PCIe device.

The following paragraphs describe examples of various ones of the embodiments disclosed herein.

Example 1 is a host device, comprising: a processor; logic coupled with the processor, to: identify a tag identifier (Tag ID) for a process or container of the host device, wherein the Tag ID identifies a queue pair of a hardware device of the host device for an outbound transaction from the processor to the hardware device, the outbound transaction to be conducted by the process or container; and map the Tag ID to a Process Address Space Identifier (PASID) associated with an inbound transaction from the hardware device to the processor, wherein the process or container is to use the PASID to conduct the outbound transaction via the identified queue pair.

Example 2 may include the subject matter of Example 1, wherein the logic is to: identify the queue pair as an unused queue pair from a pool of queue pairs; generate the Tag ID associated with the identified queue pair; and cause storage of the Tag ID for the queue pair in a register of the host device.

Example 3 may include the subject matter of Example 2, wherein the outbound transaction comprises a request to access a memory associated with the hardware device, wherein the logic is to: receive the memory access request; determine whether the memory access request includes the Tag ID; and based on a result of the determination, provide the Tag ID to the second logic.

Example 4 may include the subject matter of Example 3, wherein the Tag ID comprises a namespace identifier associated with the memory request.

Example 5 may include the subject matter of Example 4, wherein the logic is to: determine whether the queue pair is enabled with PASID capability; and based on a result of the determination, include the Tag ID in a PASID field in a Transaction Layer Packet (TLP) prefix; and generate a transaction to the queue pair in accordance with the memory request and in association with the PASID TLP prefix, to cause the transaction to be performed by the process or container using the queue pair.

Example 6 may include the subject matter of Example 5, wherein the transaction is a Peripheral Component Interconnect Express (PCIe) transaction, and wherein the hardware device is a PCIe device.

Example 7 may include the subject matter of Example 5, wherein the logic is first logic, wherein the host device further comprises second logic coupled with the processor to: set a PASID enable indicator of a per-queue PASID register of the hardware device to enable the hardware device to perform the transaction using the queue pair; use the namespace identifier to set the per-queue PASID register; and re-initialize the queue pair to be used in the transaction.

Example 8 may include the subject matter of Example 7, further comprising third logic coupled with the processor to store PASIDs associated with inbound transactions between the hardware device and the processor in a PASID repository, wherein the logic is to retrieve the PASID from the PASID repository.

Example 9 is a hardware device, comprising: logic to perform privilege check for an outbound transaction initiated by a host device and associated with a Process Address Space Identifier (PASID) that indicates a queue pair of the hardware device, wherein the PASID is a PASID of a process or container of the host device associated with the outbound transaction, wherein to perform the privilege check includes to compare the PASID with PASID values stored in a per queue PASID register of the hardware device, and to allow the outbound transaction based at least in part on a result of the comparison.

Example 10 may include the subject matter of Example 9, wherein the logic is to, prior to the comparison of the PASID associated with the queue pair with PASID values stored in the per queue PASID register: determine that a PASID Extended Capability indicator of a PASID Extended Capability register is set; and determine that a PASID Enabled indicator of per-queue PASID register associated with the queue pair is set, wherein the PASID Extended Capability register provides for enablement of outbound transactions, and wherein the outbound transactions comprise Peripheral Component Interconnect Express (PCIe) transactions, and wherein the hardware device is an input-output (I/O) PCIe device.

Example 11 may include the subject matter of Example 10, wherein the PASID is included in a Transaction Layer Packet (TLP) prefix, wherein the PASID Extended Capability indicator indicates a capability of the hardware device to perform outbound transactions associated with the PASID TLP prefix.

Example 12 may include the subject matter of any of Examples 9 to 11, wherein the logic is to receive the PASID from the host device.

Example 13 is a method for utilizing resources of a hardware device of a host device, comprising: identifying, by the host device, a tag identifier (Tag ID) for a process or container of the host device, wherein the Tag ID identifies a queue pair of a hardware device of the host device for an outbound transaction between the processor and the hardware device, the outbound transaction to be conducted by the process or container; and mapping, by the host device, the Tag ID to a Process Address Space Identifier (PASID) associated with an inbound transaction between the hardware device and the processor, to enable the outbound transaction by the process or container via the identified queue pair.

Example 14 may include the subject matter of Example 13, further comprising: identifying, by the host device, the queue pair as an unused queue pair from a pool of queue pairs; generating, by the host device, the Tag ID associated with the identified queue pair; and causing, by the host device, storage of the Tag ID for the queue pair in a register of the host device.

Example 15 may include the subject matter of Example 14, wherein the outbound transaction comprises a request to access a memory associated with the hardware device, wherein the method further comprises: receiving, by the host device, the memory access request; and determining, by the host device, whether the memory access request includes the Tag ID, wherein the Tag ID comprises a namespace identifier associated with the memory request.

Example 16 may include the subject matter of Example 15, further comprising: determining, by the host device, whether the queue pair is PASID-enabled; and based on a result of the determination, including, by the host device, the PASID in a Transaction Layer Packet (TLP) prefix; and generating, by the host device, a transaction to the queue pair in accordance with the memory request and in association with the PASID TLP prefix, to perform the transaction using the queue pair.

Example 17 may include the subject matter of Example 16, further comprising: setting, by the host device, a PASID Enabled indicator of a per-queue PASID register of the hardware device to enable the hardware device to perform the transaction using the queue pair; using, by the host device, the namespace identifier to set the per-queue PASID register; and re-initializing, by the host device, the queue pair to be used in the transaction.

Example 18 may include the subject matter of any of Examples 14 to 17, further comprising: retrieving, by the host device, the PASID from a PASID repository associated with the host device.

Example 19 is a method for utilizing resources of a hardware device of a host device, comprising: comparing, by the hardware device of the host device, a Process Address Space Identifier (PASID) that indicates a queue pair of the hardware device, with PASID values stored in a per queue PASID register of the hardware device, wherein the PASID is a PASID of a process or container of the host device associated with the outbound transaction; and performing or causing to be performed, by the hardware device, the outbound transaction based at least in part on a result of the comparison.

Example 20 may include the subject matter of Example 19, further comprising: prior to the comparison of the PASID associated with the queue pair with PASID values stored in the per queue PASID register, determining, by the hardware device, that a PASID Extended Capability indicator of a PASID Extended Capability register is set; and determining, by the hardware device, that a PASID Enabled indicator of per-queue PASID register associated with the queue pair is set, wherein the PASID Extended Capability register provides for performance of outbound transactions, wherein the outbound transactions comprise Peripheral Component Interconnect Express (PCIe) transactions, and wherein the hardware device is a PCIe device.

Example 21 may include the subject matter of Example 20, further comprising: receiving, by the hardware device, the PASID from the host device.

Example 22 may include the subject matter of any of Examples 19 to 21, wherein the PASID is included in a Transaction Layer Packet (TLP) prefix.

Example 23 may include the subject matter of Example 22, wherein the PASID Extended Capability indicator indicates a capability of the hardware device to perform outbound transactions associated with the PASID TLP prefix.

Example 24 is one or more computer readable media having instructions for utilizing resources of a hardware device of a host device thereon that, in response to execution by one or more processing devices of an apparatus, cause the apparatus to: identify a tag identifier (Tag ID) for a process or container of the host device, wherein the Tag ID identifies a queue pair of a hardware device of the host device for an outbound transaction between the processor and the hardware device, the outbound transaction to be conducted by the process or container; and map the Tag ID to a Process Address Space Identifier (PASID) associated with an inbound transaction between the hardware device and the processor, to enable the outbound transaction by the process or container via the identified queue pair.

Example 25 may include the subject matter of Example 24, wherein the instructions cause the apparatus to: identify the queue pair as an unused queue pair from a pool of queue pairs; generate the Tag ID associated with the identified queue pair; and cause storage of the Tag ID for the queue pair in a register of the host device.

Example 26 may include the subject matter of Example 25, wherein the outbound transaction comprises a request to access a memory associated with the hardware device, wherein the instructions cause the apparatus to: receive the memory access request; and determine whether the memory access request includes the Tag ID, wherein the Tag ID comprises a namespace identifier associated with the memory request.

Example 27 may include the subject matter of Example 26, wherein the instructions cause the apparatus to: determine whether the queue pair is PASID-enabled; and based on a result of the determination, include the PASID in a Transaction Layer Packet (TLP) prefix; and generate a transaction to the queue pair in accordance with the memory request and in association with the PASID TLP prefix, to perform the transaction using the queue pair.

Example 28 may include the subject matter of Example 27, wherein the instructions cause the apparatus to: set a PASID enable indicator of a per-queue PASID register of the hardware device to enable the hardware device to perform the transaction using the queue pair; use the namespace identifier to set the per-queue PASID register; and re-initialize the queue pair to be used in the transaction.

Example 29 is one or more computer readable media having instructions for utilizing resources of a hardware device of a host device thereon that, in response to execution by one or more processing devices of an apparatus, cause the apparatus to: compare a Process Address Space Identifier (PASID) that indicates a queue pair of the hardware device, with PASID values stored in a per queue PASID register of the hardware device, wherein the PASID is a PASID of a process or container of the host device associated with the outbound transaction; and perform or cause to be performed the outbound transaction based at least in part on a result of the comparison.

Example 30 may include the subject matter of Example 29, wherein the instructions cause the apparatus to: prior to the comparison of the PASID associated with the queue pair with PASID values stored in the per queue PASID register, determine that a PASID Extended Capability indicator of a PASID Extended Capability register is set; and determine that a PASID enable indicator of per-queue PASID register associated with the queue pair is set, wherein the PASID Extended Capability register provides for performance of outbound transactions, wherein the outbound transactions comprise Peripheral Component Interconnect Express (PCIe) transactions, and wherein the hardware device is a PCIe device.

Example 31 may include the subject matter of Example 30, wherein the instructions cause the apparatus to receive the PASID from the host device.

Example 32 may include the subject matter of any of Examples 29 to 31, wherein the PASID is included in a Transaction Layer Packet (TLP) prefix.

Example 33 may include the subject matter of Example 32, wherein the PASID Extended Capability indicator indicates a capability of the hardware device to perform outbound transactions associated with the PASID TLP prefix.

Example 34 is a host device, comprising: means for identifying a tag identifier (Tag ID) for a process or container of the host device, wherein the Tag ID identifies a queue pair of a hardware device of the host device for an outbound transaction between the processor and the hardware device, the outbound transaction to be conducted by the process or container; and means for mapping the Tag ID to a Process Address Space Identifier (PASID) associated with an inbound transaction between the hardware device and the processor, to enable the outbound transaction by the process or container via the identified queue pair.

Example 35 may include the subject matter of Example 34, further comprising: means for identifying the queue pair as an unused queue pair from a pool of queue pairs; means for generating the Tag ID associated with the identified queue pair; and means for causing storage of the Tag ID for the queue pair in a register of the host device.

Example 36 may include the subject matter of Example 35, wherein the outbound transaction comprises a request to access a memory associated with the hardware device, wherein the device further comprises: means for receiving the memory access request; and means for determining whether the memory access request includes the Tag ID, wherein the Tag ID comprises a namespace identifier associated with the memory request.

Example 37 may include the subject matter of Example 36, further comprising: means for determining whether the queue pair is PASID-enabled; and means for including the PASID in a Transaction Layer Packet (TLP) prefix; and means for generating a transaction to the queue pair in accordance with the memory request and in association with the PASID TLP prefix, to perform the transaction using the queue pair.

Example 38 may include the subject matter of Example 37, further comprising: means for setting a PASID enable indicator of a per-queue PASID register of the hardware device to enable the hardware device to perform the transaction using the queue pair; means for using the namespace identifier to set the per-queue PASID register; and means for re-initializing the queue pair to be used in the transaction.

Example 39 may include the subject matter of Examples 35 to 38, further comprising: means for retrieving the PASID from a PASID repository associated with the host device.

Example 40 is a hardware device, comprising: means for comparing a Process Address Space Identifier (PASID) that indicates a queue pair of the hardware device, with PASID values stored in a per queue PASID register of the hardware device, wherein the PASID is a PASID of a process or container of a host device associated with the outbound transaction; and means for performing or causing to be performed, by the hardware device, the outbound transaction based at least in part on a result of the comparison.

Example 41 may include the subject matter of Example 40, further comprising: means for determining, prior to the comparison of the PASID associated with the queue pair with PASID values stored in the per queue PASID register, that a PASID Extended Capability indicator of a PASID Extended Capability register is set; and means for determining that a PASID enable indicator of per-queue PASID register associated with the queue pair is set, wherein the PASID Extended Capability register provides for performance of outbound transactions, wherein the outbound transactions comprise Peripheral Component Interconnect Express (PCIe) transactions, and wherein the hardware device is a PCIe device.

Example 42 may include the subject matter of Example 40, further comprising: means for receiving the PASID from the host device.

Example 43 may include the subject matter of any of Examples 40 to 42, wherein the PASID is included in a Transaction Layer Packet (TLP) prefix.

Example 44 may include the subject matter of Example 43, wherein the PASID Extended Capability indicator indicates a capability of the hardware device to perform outbound transactions associated with the PASID TLP prefix.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. A host device, comprising:
   a processor;
   logic coupled with the processor, to: identify a tag identifier (Tag ID) for a process or container of the host device, wherein the Tag ID identifies a queue pair of a hardware device of the host device for an outbound transaction from the processor to the hardware device, the outbound transaction to be conducted by the process or container; and map the Tag ID to a Process Address Space Identifier (PASID) associated with an inbound transaction from the hardware device to the processor, wherein the process or container is to use the PASID to conduct the outbound transaction via the identified queue pair.

2. The host device of claim 1, wherein the logic is to:
   identify the queue pair as an unused queue pair from a pool of queue pairs;
   generate the Tag ID associated with the identified queue pair; and
   cause storage of the Tag ID for the queue pair in a register of the host device.

3. The host device of claim 2, wherein the outbound transaction comprises a request to access a memory associated with the hardware device, wherein the logic is to:
   receive the memory access request;
   determine whether the memory access request includes the Tag ID; and
   based on a result of the determination, provide the Tag ID to second logic.

4. The host device of claim 3, wherein the Tag ID comprises a namespace identifier associated with the memory request.

5. The host device of claim 4, wherein the logic is to:
   determine whether the queue pair is enabled with PASID capability; and
   based on a result of the determination,
      include the Tag ID in a PASID field in a Transaction Layer Packet (TLP) prefix; and
      generate a transaction to the queue pair in accordance with the memory request and in association with the PASID TLP prefix, to cause the transaction to be performed by the process or container using the queue pair.

6. The host device of claim 5, wherein the transaction is a Peripheral Component Interconnect Express (PCIe) transaction, and wherein the hardware device is a PCIe device.

7. The host device of claim 5, wherein the logic is first logic, wherein the host device further comprises the second logic coupled with the processor to:
   set a PASID enable indicator of a per-queue PASID register of the hardware device to enable the hardware device to perform the transaction using the queue pair;

use the namespace identifier to set the per-queue PASID register; and re-initialize the queue pair to be used in the transaction.

8. The host device of claim 7, further comprising third logic coupled with the processor to store PASIDs associated with inbound transactions between the hardware device and the processor in a PASID repository, wherein the third logic is to retrieve the PASID from the PASID repository.

9. A hardware device, comprising:
logic to perform privilege check for an outbound transaction initiated by a host device and associated with a Process Address Space Identifier (PASID) that indicates a queue pair of the hardware device, wherein the PASID is a PASID of a process or container of the host device associated with the outbound transaction, wherein to perform the privilege check includes to compare the PASID with PASID values stored in a per-queue PASID register of the hardware device, and to allow the outbound transaction based at least in part on a result of the comparison.

10. The hardware device of claim 9, wherein the logic is to, prior to the comparison of the PASID associated with the queue pair with PASID values stored in the per-queue PASID register:
determine that a PASID Extended Capability indicator of a PASID Extended Capability register is set; and
determine that a PASID Enabled indicator of the per-queue PASID register associated with the queue pair is set,
wherein the PASID Extended Capability register provides for enablement of outbound transactions, and wherein the outbound transactions comprise Peripheral Component Interconnect Express (PCIe) transactions, and wherein the hardware device is an input-output (I/O) PCIe device.

11. The hardware device of claim 10, wherein the PASID is included in a Transaction Layer Packet (TLP) prefix, wherein the PASID Extended Capability indicator indicates a capability of the hardware device to perform outbound transactions associated with the PASID TLP prefix.

12. The hardware device of claim 9, wherein the logic is to receive the PASID from the host device.

13. A method for utilizing resources of a hardware device of a host device, comprising:
identifying, by the host device, a tag identifier (Tag ID) for a process or container of the host device, wherein the Tag ID identifies a queue pair of a hardware device of the host device for an outbound transaction between the processor and the hardware device, the outbound transaction to be conducted by the process or container; and
mapping, by the host device, the Tag ID to a Process Address Space Identifier (PASID) associated with an inbound transaction between the hardware device and the processor, to enable the outbound transaction by the process or container via the identified queue pair.

14. The method of claim 13, further comprising:
identifying, by the host device, the queue pair as an unused queue pair from a pool of queue pairs;
generating, by the host device, the Tag ID associated with the identified queue pair; and
causing, by the host device, storage of the Tag ID for the queue pair in a register of the host device.

15. The method of claim 14, wherein the outbound transaction comprises a request to access a memory associated with the hardware device, wherein the method further comprises:

receiving, by the host device, the memory access request; and determining, by the host device, whether the memory access request includes the Tag ID, wherein the Tag ID comprises a namespace identifier associated with the memory request.

16. The method of claim 15, further comprising:
determining, by the host device, whether the queue pair is PASID-enabled; and
based on a result of the determination,
including, by the host device, the PASID in a Transaction Layer Packet (TLP) prefix; and
generating, by the host device, a transaction to the queue pair in accordance with the memory request and in association with the PASID TLP prefix, to perform the transaction using the queue pair.

17. The method of claim 16, further comprising:
setting, by the host device, a PASID Enabled indicator of a per-queue PASID register of the hardware device to enable the hardware device to perform the transaction using the queue pair;
using, by the host device, the namespace identifier to set the per-queue PASID register; and
re-initializing, by the host device, the queue pair to be used in the transaction.

18. The method of claim 14, further comprising:
retrieving, by the host device, the PASID from a PASID repository associated with the host device.

19. A method for utilizing resources of a hardware device of a host device, comprising:
comparing, by the hardware device of the host device, a Process Address Space Identifier (PASID) that indicates a queue pair of the hardware device, with PASID values stored in a per-queue PASID register of the hardware device, wherein the PASID is a PASID of a process or container of the host device associated with an outbound transaction; and
performing or causing to be performed, by the hardware device, the outbound transaction based at least in part on a result of the comparison.

20. The method of claim 19, further comprising:
prior to the comparison of the PASID associated with the queue pair with PASID values stored in the per-queue PASID register,
determining, by the hardware device, that a PASID Extended Capability indicator of a PASID Extended Capability register is set; and
determining, by the hardware device, that a PASID Enabled indicator of the per-queue PASID register associated with the queue pair is set,
wherein the PASID Extended Capability register provides for performance of outbound transactions, wherein the outbound transactions comprise Peripheral Component Interconnect Express (PCIe) transactions, and wherein the hardware device is a PCIe device.

21. The method of claim 20, further comprising:
receiving, by the hardware device, the PASID from the host device.

22. The method of claim 19, wherein the PASID is included in a Transaction Layer Packet (TLP) prefix.

23. The method of claim 22, wherein the PASID Extended Capability indicator indicates a capability of the hardware device to perform outbound transactions associated with the PASID TLP prefix.

24. One or more computer readable media having instructions thereon that, in response to execution by one or more processing devices of an apparatus, cause the apparatus to perform the method of claim 13.

25. One or more computer readable media having instructions thereon that, in response to execution by one or more processing devices of an apparatus, cause the apparatus to perform the method of claim 19.

* * * * *